Jan. 25, 1966  C. W. WEILAND  3,231,038
FIXED WING GROUND EFFECT CRAFT
Filed Jan. 29, 1964  2 Sheets-Sheet 1

INVENTOR
CARL W. WEILAND

BY
Nilsson, Robbins & Anderson
ATTORNEYS

Jan. 25, 1966  C. W. WEILAND  3,231,038

FIXED WING GROUND EFFECT CRAFT

Filed Jan. 29, 1964  2 Sheets-Sheet 2

INVENTOR
CARL W. WEILAND
BY
Nilsson, Robbins & Anderson
ATTORNEYS

United States Patent Office 3,231,038
Patented Jan. 25, 1966

3,231,038
FIXED WING GROUND EFFECT CRAFT
Carl W. Weiland, Palos Verdes, Calif., assignor to Douglas Aircraft Company, Inc., Santa Monica, Calif.
Filed Jan. 29, 1964, Ser. No. 340,880
4 Claims. (Cl. 180—7)

This invention relates generally to ground effect aircraft and more particularly to such a craft having a hover capability and which includes a fixed wing for providing lift and stability during forward flight.

The principles of ground effect whereby a body is supported on a pressurized cushion of air maintained between the body and a supporting surface have been known for a great number of years and have been demonstrated in a variety of practical utilizations and mechanisms.

In typical non-wing ground effect vehicles, a fan system is provided which directs the flow of air downwardly to form the supporting cushion of air between the vehicle and the ground surface. The thickness of supporting cushion is usually limited to a few feet by practical design considerations including lateral boundary definition or peripheral sealing requirements, fuel economy, and vehicle attitude stability. With such limitations it is apparent that if forward motion is desired, appropriate thrust must be provided and the vehicle must either travel slowly or over only relatively smooth terrain or water.

In a winged ground effect machine, the lifting cushion is dynamically created beneath its wing by its forward velocity over the ground or water. The lifting pressure in the cushion is achieved by the undersurface of the wing having a definitely positive angle of attack which effectively funnels or rams a large volume of air into a smaller volume toward the trailing edge of the wing between the wing and the ground.

While both of these general types of ground effect machines are useful they each suffer from a number of disadvantages or deficiencies which constitute a limitation on their broader acceptance and utilization. For example, in wingless types of ground effect machines it is relatively difficult to maintain attitude stabilization particularly when forward velocity is provided; and all the lift must be provided at all times by a fan system. The effectiveness of the fan for providing thrust for forward travel is therefore relatively poor. In winged types of ground effect machines, on the other hand, the problems of conventional airplanes are in large measure repeated; for example, large takeoff areas are needed; lift always depends upon forward velocity; they must have elaborate landing gear if they are to land on solid ground because of their inherently high landing speeds; and the necessarily fast landing approach gives rise to a safety disadvantage. Further, in order to obtain the necessary lift, the wing must have forward motion and when operating from a water surface, the desired rate of forward motion is difficult to obtain due to the effect of the drag of the water on the vehicle. Means which are typically complex and structurally unreliable must therefore be provided effectively to reduce such drag to enable adequate forward speed whereby to establish the necessary dynamic condition of forward velocity and associated lift. Prior attempts to meet this problem have typically resulted in systems that are complex, difficult to control, structurally unreliable or otherwise less than adequately effective.

Accordingly, it is an object of the present invention to provide an airborne ground effect vehicle which is not subject to these and other disadvantages of the prior art.

It is another object to provide such a craft which is capable of substantially vertical takeoff and substantially zero velocity landing approach thereby obviating the need for complex landing gear while at the same time providing a truly amphibious craft.

It is another object to provide such an aircraft which has: high comfort and safety factors, a high lift to drag ratio and being thereby relatively highly efficient, and being in other respects well suited for commercial operation.

It is another object to provide such a vehicle which is relatively simple and inexpensive to manufacture, operate and maintain.

It is another object to provide such a ground effect machine which is inherently highly stable whether hovering or traveling forward at velocities of the order of 100 miles per hour.

Briefly, these and other objects are achieved in accordance with structural features of one example of the invention which includes a hull or fuselage for housing the crew and passengers or other payload. A relatively thick, hollow wing is affixed to the underside of the fuselage and has a chord dimension which is comparable, in this example, to the length of the fuselage. In any event the center of gravity of the wing-lifting surfaces is longitudinally close to the center of gravity of the craft. The undersurface of the wing is predominantly flat and level with however a slightly positive angle of forward attack. The wing configuration is essentially swept back; and a vertical stabilizer is disposed at each wing tip projecting upwardly therefrom. A horizontal stabilizer is affixed to the upper extremity of each of the vertical stabilizers.

Each wing half in this example carries two engines which each operate two fans. One of the fans in each pair may be directly driven by an engine and the other operated as a belt-driven slave unit therefrom. Each fan is disposed in a large forwardly exposed duct which communicates between the upper leading portion of the wing and its hollow interior.

An elongated duct transversely to its flow direction is formed along substantially the entire periphery of the undersurface of the wing to define an air outlet jet for the air contained in the hollow wing pressure reservoir. The porting is adapted to direct the escaping air, as a curtain shaped jet, toward the central portion of the air cushion thereby formed between the wing and the surface of the ground or water. The elongated peripheral jet thusly provides a pneumatic curtain tending to maximize and retain the lifting pressure in the ground effect air cushion.

For purposes of further maximizing the lifting pressure in the supporting air cushion, a plenum forming vane may be hingedly affixed to the rear portion of the underside of the wing. When the wing is lowered as in the manner of flaps, the lifting pressure in the air cushion is increased because of the greater resistance of the flow of pressurized air rearwardly out of the underwing space.

Although the rear of the large ducts which house the fans may, as indicated above, be coupled to the air pressure plenum, they may be operationally alternatively ported rearwardly directly out of the trailing portion of the wing to provide jet thrust for forward propulsion of the craft. The porting of the fan ducts rearwardly or into the hollow wing interior is controlled by the operator whereby the engine's function at any time may be utilized entirely for lift or, alternatively, entirely for forward thrust or any desired proportion of function therebetween.

In typical operation for example the rearward ports are closed initially, the engines are throttled to high rotary velocity, and the craft is lifted on its supporting air cushion without appreciable forward motion. Once vertically clear of the terrain, the rearward ducts may be gradually opened for forward acceleration. At operational forward velocity, considerable additional lift is provided aerodynamically by the wings both in the conventional airfoil manner as well as in the manner of creating a dynamically generated ground effect lifting pressure under the wing due to the forward motion of the wing in a ground effect region near the water or terrain surface over which the craft is operated.

These and other features of the present invention which are believed to be novel and patentable are set forth in the claims which form a part of this specification and which define the scope of the invention. For better understanding of the invention, reference is made to the following description of the accompanying drawings which are presented expressly by way of example only and in which:

With more specific reference now to the figures in detail, it is stressed that the particulars shown are by way of example and for purposes of illustrative discussion only and are presented in the cause of providing what is believed the most useful and readily understood description of the principles and structural concepts of the invention.

In this regard no attempt is made to show structural details of the apparatus in more detail than is necessary for a fundamental understanding of the conceptual aspects of the invention, the description taken along with the drawings making apparent to those skilled in the art how the several forms of the invention may be embodied in practice.

Specifically the detailed showing is not to be taken as a limitation upon the scope of the invention which is, as indicated above, defined by the appended claims forming, along with the drawings, a part of this specification.

Figure 1:
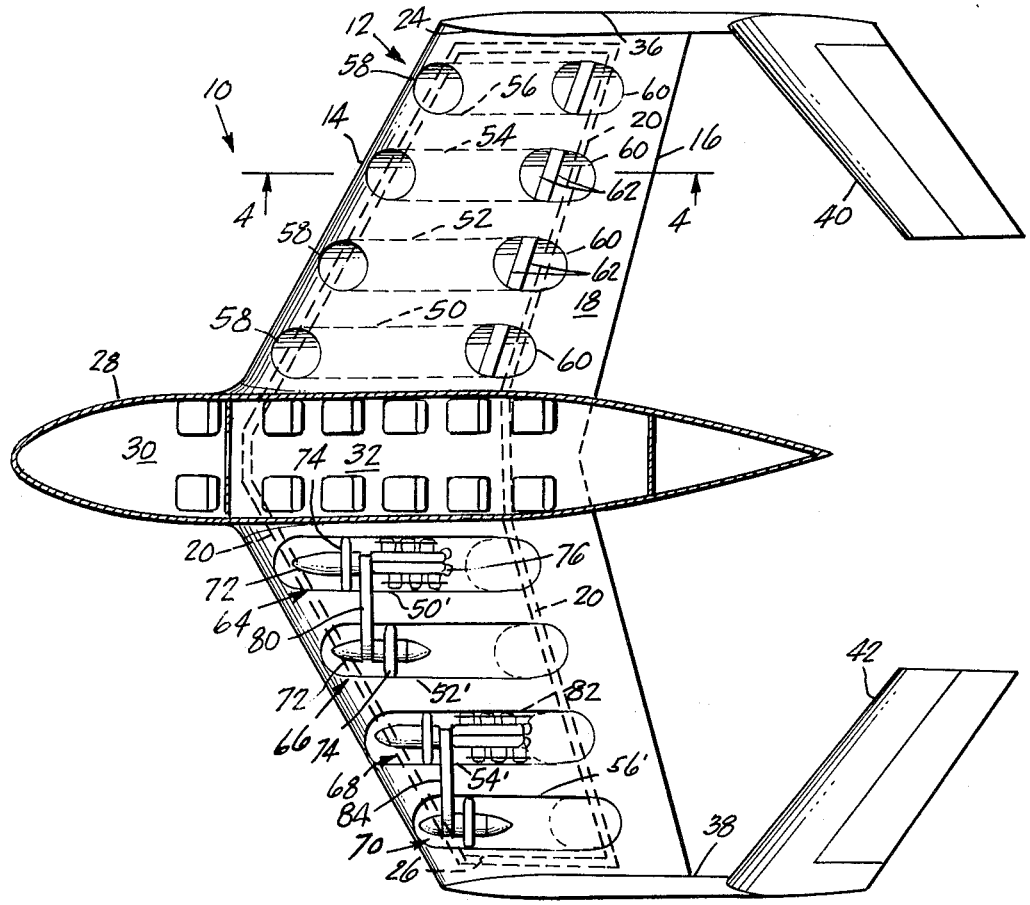
FIGURE 1 is a plan view partially in section of an example of a fixed wing ground effect aircraft constructed in accordance with the principles of the present invention.

In the plan view of FIGURE 1 the ground effect aircraft 10 is seen to include a large swept back configuration wing assembly 12 having leading and trailing edges 14, 16 respectively. The wing assembly includes an upper airfoil shaped surface 18 and a lower surface, not shown, a major portion of which is substantially flat and horizontal for defining the upper boundary of a supporting ground effect air cushion which is formed below the wing during flight of the aircraft 10. Shown in dotted lines in this figure, however, is an elongated substantially closed loop air cushion forming output duct 20 which extends along substantially the entire leading edge of the lower surface of the wing assembly 12, across at least a portion of its wing tip portions 24, 26, respectively, and along the rear portion somewhat forward of the trailing edge 16. The area within the air cushion forming output duct 20, as will be explained in more detail below, substantially defines the lateral perimeter of the ground effect air cushion beneath the craft. As will also be shown in more detail below, the lifting cushion air is supplied through the duct 20 in a high velocity, curtain shaped jet which is directed downwardly from the lower wing surface and somewhat inwardly with respect to the perimeter of the wing. Thus the trailing edge portion of the air forming output duct 20 projects its curtain of air slightly forwardly while the leading edge portion of the duct 20 projects its curtain jet air supply effectively somewhat rearwardly, and the curtain jet from the wing tip portions of the duct 20 is projected somewhat in an inboard direction with respect to the wing tip portions 24, 26.

Centrally mounted above the wing assembly 12 is, in this example, a fuselage hull 28 which may include a control cockpit 30 and a cargo or passenger cabin 32. Of course alternate configurations of the hull-wing relationship may be utilized without departing from the scope of the invention. For example twin hulls may be readily utilized where desired or the craft in larger versions thereof particularly, may be of a flying wing configuration wherein the hull is formed within the airfoil of the relatively thick hollow wing.

The vertical stabilizer may be mounted on the after portion of the hull fuselage 28 or may, as shown in the figure, be mounted at each wingtip in a double fin arrangement with one vertical stabilizer 36 being mounted upright from the wingtip portion 24 and another vertical stabilizer 38 mounted upright from the end of the wingtip portion 26. As shown in the subsequent figures, the vertical stabilizers 36, 38 may in a conventional manner include in their after portions a rudder component for direction pointing control. A horizontal stabilizer and elevator assembly 40, 42 may be carried, as shown, by the upper tip portions of the vertical stabilizers 36, 38, respectively, for horizontal flight control including trim and altitude control functions.

In the starboard half of the wing, as seen in the figure, a set of four air supply ducts 50, 52, 54, 56, indicated by dotted lines, extend in a fore and aft direction through the wing assembly 12, each duct having an inlet port 58 disposed in the upper airfoil shaped surface 18 near the leading edge 14 of the wing assembly and a jet outlet port 60 disposed through the surface 18 near the trailing edge 16. The rear, jet outlet ports 60 are each covered by a set of louvre type valves 62 which are operable, as explained below, to control the magnitude of forward thrust for the ground effect aircraft 10.

On the port, as seen in the figure, side of the aircraft 10, the upper surface 18 of the wing assembly 12 is indicated as being partially cutaway thereby to show the air supply ducts 50', 52', 54', 56' as open from above. The air supply ducts are substantially circular in cross section and each form a housing for a fan assembly 64, 66, 68, 70. Each of the fan assemblies is supported within its respective air supply duct by radial struts, not shown, and each includes an axial shaft and spinner 72 and a rotary impeller unit 74. In this example the two inboard fan assemblies, on each side of the wing assembly, are driven by a single engine 76 carried within the air supply duct 50' on the port side, and by an engine, not shown, within the air supply duct 50 on the starboard side. The engine 76 is directly coupled to the fan assembly 64 and is belt-coupled by a driving belt 80 to the fan assembly 66. Similarly an engine 82 mounted within the air supply duct 54' is directly coupled to the fan assembly 68 and is belt-coupled by a driving belt 84 to the fan assembly 70. Further details of the structure of a typical one of the air supply ducts within the airfoil section of the wing assembly will be presented and discussed below in connection with a subsequent figure.

Figure 2:
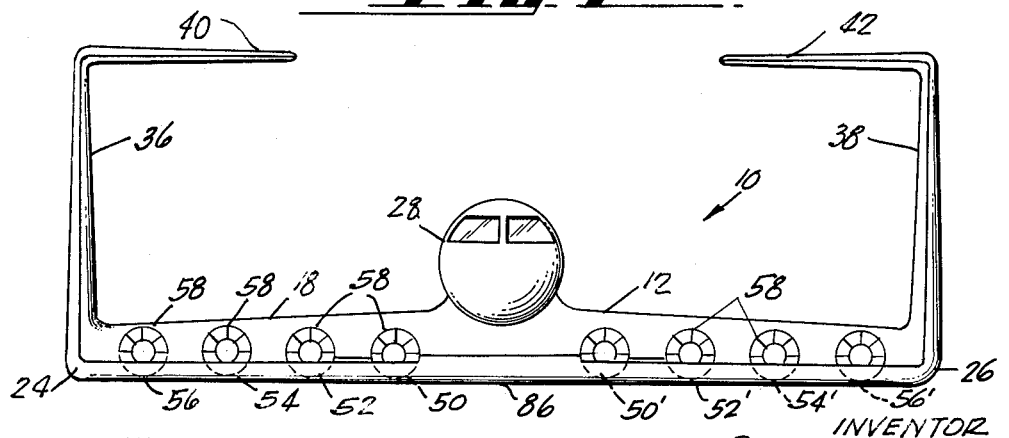
FIGURE 2 is a frontal, elevational view of the structure illustrated in FIGURE 1.

Referring to FIGURE 2 the frontal view of the ground effect aircraft 10 illustrates the high, central mounting of the hull fuselage 28 with respect to the wing assembly 12. Also shown is the relationship of the air supply ducts 50, 52, 54, 56, 50', 52', 54', 56', with respect to the upper, airfoil surface 18 of the wing assembly and the lower wing surface 86. The latter, as indicated above, defines the upper boundary for the ground effect supporting air cushion developed during flight beneath the ground effect aircraft 10. The vertical stabilizers 36, 38, with their respective horizontal stabilizer and elevator assemblies 40, 42, are seen to extend upwardly at approximately right angles to the wing tip portions 24, 26, respectively, to which they are attached. This configuration for the horizontal control surfaces permits them to be well above the turbulence and waterspray which may be associated with the wing assembly and hull fuselage. This arrangement also provides excellent roll attitude control as well as pitch stability for the aircraft.

Figure 3:
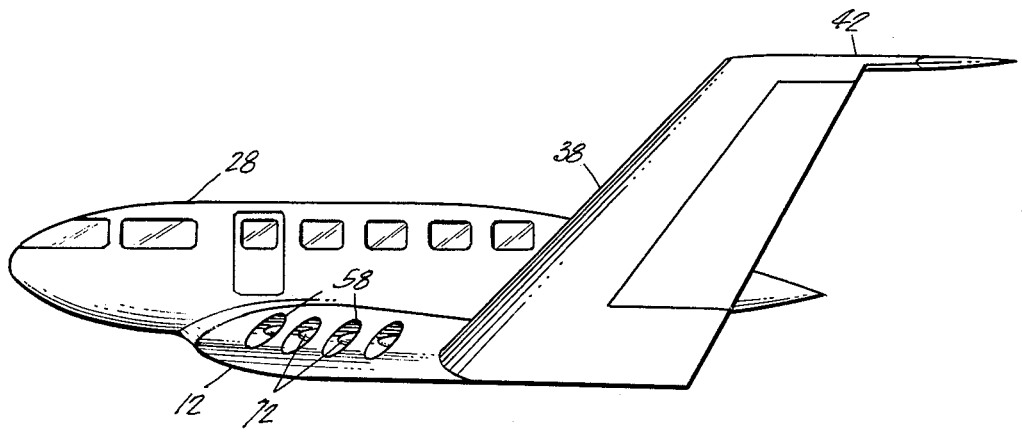
FIGURE 3 is a side elevational view of the example of the invention illustrated in the previous figures.

Referring to FIGURE 3 the side elevational view presented illustrates emphatically the sweptback configuration of the wing assembly 12 with respect to the streamlined hull fuselage 28. The continuity of the swept-back configuration is carried through the vertical stabilizers 38 and the horizontal stabilizer and elevator assembly 42. Also seen in this view of this example of the invention are the air supply duct inlet ports 58, and a portion of the port side axial shaft and spinners 72.

Figure 4:
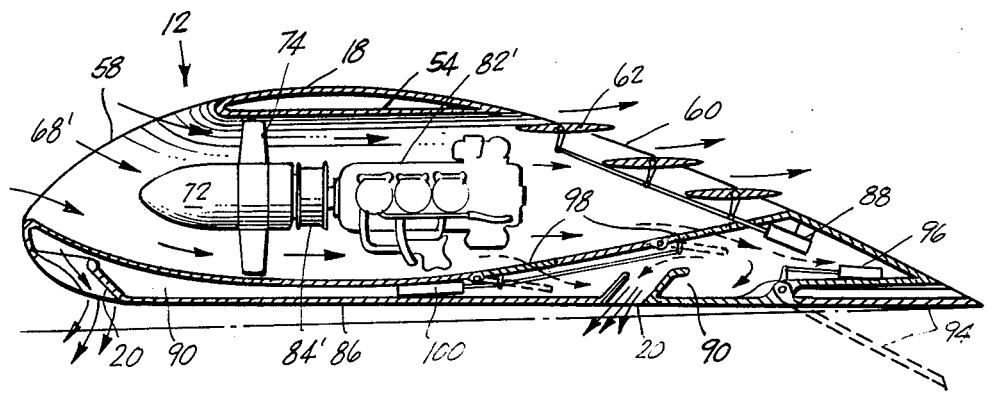
FIGURE 4 is a cross sectional view of the structure of FIGURE 1 taken along the lines 4—4 thereof.

In FIGURE 4 some of the structure of the air supply duct 54 is shown in more detail. The duct 54 is seen to terminate at its forward end in the inlet port 58 and at its rearward end in the jet outlet port 60, both of which are formed within the upper airfoil shape surface 18 of the wing assembly 12. The outlet port 60 may be opened and closed as desired, for purposes discussed in more detail below, by the set of louvre-type valves 62 which are ganged together by mechanical linkage and actuated by a control driving unit 88. The fan assembly 68' with its shaft and spinner 72 and rotary impeller unit 74 is shown axially and horizontally aligned with the engine 82' which drives both it directly and an adjacent fan assembly, not shown, by means of the driving belt 84'.

A major portion of the internal volume of the wing assembly 12 is hollow and defines an air pressure reservoir plenum 90. The plenum extends between, above and below as well as to the rear of each of the air supply ducts within which the fan assemblies are mounted. In particular it may be noted, with reference also to FIGURE 1, that the plenum 90 extends beyond the plan outline of the air cushion forming output duct 20.

The elongated duct 20 communicates with the plenum 90 along its entire length in the manner shown in cross section in FIGURE 4. Also shown in FIGURE 4 is the shape character of the duct 20 by which means the curtain shaped air cushion forming jet is directed downwardly and somewhat inwardly toward the central portion of the resulting air cushion; this for the purposes of increasing the efficiency and overall magnitude of lift of the aircraft 10. The air being directed in this direction is sustained at a somewhat higher average pressure, since it must to some extent change direction before it can escape from the effective plenum of the air cushion beneath the craft. Further, in this connection, a plenum forming flap 94, disposed substantially coplanarly with the undersurface 86 of the wing assembly 12, may be hingedly lowered by a control unit 96 for purposes of further aiding the sustaining of lifting pressure in the ground effect air cushion. The flap 94 also functions in its normal aerodynamic sense of braking the aircraft and providing additional lift as desired.

In addition to the jet outlet port 60 with its louvre-type valves 62, a second controlled output means for the air supply duct 54 is formed in the side wall thereof in the form of a set of louvre-type valves 98 which provide air flow communication between the air supply duct 54 and the air pressure reservoir plenum 90 and which are controlled by mechanical linkage with a control driving unit 100.

In operation, the craft 10 is initially, typically, at rest on the surface of relatively calm water with the engines throttled at idle. For takeoff, the louvre-type valves 62 are closed and the valves 98 are opened so that the air supply provided by the fan assemblies is directed substantially entirely into the plenum reservoir 90. The air cushion plenum forming flap 94 may be lowered as desired to aid further in defining and confining the lifting air cushion as well as to provide additional aerodynamic lift during low velocity forward flight.

The engines are then accelerated to create a relatively high pressure in the reservoir plenum 90 which in turn creates the curtain shaped air jet formed by the air cushion forming output duct 20. As indicated above, the curtain jet is directed downwardly and somewhat inwardly toward the central portions of the supporting air cushion between the lower surface 86 of the craft and the terrestial, water in this example, surface.

After substantially vertical takeoff, and with the craft statically supported on the air cushion, the valves 62 are gradually opened to provide forward acceleration to a velocity, typically, of approximately 80–100 knots. Incumbent with the forward velocity is an aerodynamic component of lift due to conventional airfoil action and dynamic ground effect between the lower surface 86, with its positive angle of attack, and the water surface.

To decelerate, the valves 62 may be gradually closed and the flap 94 gradually lowered until hovering, or a desired low forward velocity is reached, at which time the craft may be lowered onto the water surface by decelerating the engines.

There has thus been illustrated and described an example of a fixed wing ground effect machine which achieves the objects and exhibits the advantages set forth hereinabove.

What is claimed is:
1. A winged ground effect vehicle having a fuselage with a longitudinal axis and further comprising: a wing assembly carried by said fuselage and including
    a lower panel member having a substantially flat portion of the character to be disposed substantially horizontally, and being mounted in a manner defining a positive angle of incidence with respect to said fuselage axis, providing, thereby, a positive angle of forward attack and defining the top boundary of a supporting ground effect air cushion region between said panel member and a terrestrial surface therebelow,
    an upper wing surface member joined with said lower panel member along mutual leading and trailing edges and defining in cooperation with said lower panel member a relatively thick airfoil section,
    an air pressure reservoir plenum disposed between said upper and lower members within said airfoil section,
        said lower panel member being ported to define elongated air output ducts communicating between said reservoir plenum and said supporting air cushion region, said ducts being adapted to direct a curtain jet of air downwardly and somewhat inwardly toward the central portion of said air cushion region;
    at least one fore-and-aft aligned air supply duct disposed through said airfoil section and having an inlet port disposed through said upper surface member near said leading edge and an outlet port disposed near said trailing edge;
    air passage means communicating between said plenum and said supply duct;
    valve means for at least partially closing said output port of said supply duct; and
    fan means disposed in said air supply duct for drawing air therethrough in selected proportions for forward thrust and supply to said supporting air cushion.

2. A ground effect aircraft comprising:
    a fuselage hull having a longitudinal axis;
    a wing assembly affixed to a lower portion of said hull and having an upper surface member and a substantially horizontally disposed lower surface panel mounted so as to define a positive angle of incidence, regarding forward flight, with respect to said longitudinal axis while defining the upper boundary of the supporting air cushion beneath the craft;
    an elongated air pressure reservoir plenum disposed between said upper surface member and said lower surface panel;
    at least two fore and aft oriented air supply ducts carried by said wing assembly and each having
        a thrust producing rear port and means for communicating with said air reservoir plenum,
        said lower panel being ported to define ground effect producing curtain jet output ducts disposed along the periphery of a major portion of said panel, said curtain jet output ducts communicating between said plenum and said supporting air cushion beneath said craft;

fan means disposed within each said air supply duct for drawing air therethrough in the fore to aft sense of direction at a thrust producing velocty;

a fan driving engine disposed in one of said supply ducts and coupled to the said fan means disposed therein;

coupling means for connecting, in a fan driving relationship, said engine to the fan means disposed in a second one of said at least two supply ducts; and valve means for controlling the proportion of the air output of said fan means through said thrust producing rear port versus said curtain jet output ducts;

said valve means including hinged louvres carried by said wing assembly and disposed transversely to each said air supply duct downstream from said fan means, and louvre closure means for achieving said controlling of said proportion of air.

3. The invention according to claim 2 which further includes: a horizontally elongate, air cushion forming vane hingedly affixed to said lower panel contiguously to and substantially parallel to its trailing portion; and control means for selectively lowering and raising said vane to provide a predetermined magnitude of aerodynamic and ground effect lift.

4. The invention according to claim 2 in which said wing assembly is formed in a swept back configuration and includes a further swept back vertical stabilizer member affixed to and extending upwardly from each wing tip portion of said wing assembly and which further includes a horizontal stabilizer member affixed to each said vertical member at a point thereon spaced upwardly from said upper surface member of said wing assembly.

References Cited by the Examiner

UNITED STATES PATENTS

| 2,194,596 | 3/1940 | Henter | 244—13 |
| 2,390,859 | 12/1945 | Warner | 180—7 |
| 3,082,976 | 3/1963 | Dornier | 244—12 |
| 3,124,322 | 3/1964 | Cockerell | 244—12 |
| 3,126,171 | 3/1964 | Stepniewski | 244—12 |

FOREIGN PATENTS 1,286,624  1/1962  France.

MILTON BUCHLER, *Primary Examiner.*

R. DAVID BLAKESLEE, FERGUS S. MIDDLETON, *Examiners.*

G. P. EDGELL, *Assistant Examiner.*